(12) United States Patent
Ellsworth et al.

(10) Patent No.: US 6,453,344 B1
(45) Date of Patent: Sep. 17, 2002

(54) MULTIPROCESSOR SERVERS WITH CONTROLLED NUMBERED OF CPUS

(75) Inventors: Robert Scott Ellsworth, Fall City, WA (US); Jonathan Russell Nolting, Clayton, CA (US); Keith Joseph Philipp, Columbia, MD (US)

(73) Assignee: Amdahl Corporation, Sunnyvale, CA (US)

(*) Notice: Subject to any disclaimer, the term of this patent is extended or adjusted under 35 U.S.C. 154(b) by 0 days.

(21) Appl. No.: 09/282,829

(22) Filed: Mar. 31, 1999

(51) Int. Cl.[7] .......................... G06F 13/10; G06F 13/14
(52) U.S. Cl. .......................... 709/220; 710/8; 710/14; 709/221; 713/100; 713/191; 711/173; 712/11; 712/20; 712/23
(58) Field of Search .................. 713/100, 191; 709/221, 220; 712/30, 11, 23, 20; 711/173; 710/1, 8, 14

(56) References Cited

U.S. PATENT DOCUMENTS

| | | | | |
|---|---|---|---|---|
| 4,843,541 A | * | 6/1989 | Bean et al. | 364/200 |
| 5,210,844 A | * | 5/1993 | Shimura et al. | 395/425 |
| 5,819,061 A | * | 10/1998 | Glassen et al. | 395/406 |
| 5,832,291 A | * | 11/1998 | Rosen et al. | 395/800.11 |
| 5,903,771 A | * | 5/1999 | Sgro et al. | 395/800.2 |
| 6,073,226 A | * | 6/2000 | Cutshall et al. | 711/203 |
| 6,226,734 B1 | * | 5/2001 | Kleinsorge et al. | 712/13 |

* cited by examiner

Primary Examiner—Jeffrey Gaffin
Assistant Examiner—Rehana Perveen
(74) Attorney, Agent, or Firm—David E. Lovejoy

(57) ABSTRACT

A multiprocessor system having a total number of available CPUs partitioned into one or more smaller pools of CPUs called servers where the number of CPUs available to a server is reduced below the total number of available CPUs. Software licensing costs are thereby reduced because the number of CPUs available to run the operating system or ISV software has been reduced to the number of CPUs in the pool of the server rather than the total number of available CPUs in the multiprocessor system. In order to enforce the isolation of CPUs required by software licensing, separate identification codes, CPUIDs, that contain unique system serial numbers are assigned to each server in the multiprocessing system. The multiprocessor system has multiple CPUIDs, one for each server (each pool of CPUs that can execute operating systems and ISV software).

18 Claims, 5 Drawing Sheets

| LP01 | LP02 | LP03 | LP04 |
|------|------|------|------|
| LP05 | LP06 | LP07 | LP08 |
| LP09 | LP10 | LP11 | LP12 |
| LP13 | LP14 | LP15 | LP16 |

▨ = SHARED
☐ = DEDICATED
▥ = OFF-LINE

| LP01 | LP02 | LP03 | LP04 |
|------|------|------|------|
| LP05 | LP06 | LP07 | LP08 |
| LP09 | LP10 | LP11 | LP12 |
| LP13 | LP14 | LP15 | LP16 |

▨ = SHARED
☐ = DEDICATED
▥ = OFF-LINE

= SHARED
= DEDICATED
= OFF-LINE

| LP01 | LP02 | LP03 | LP04 |
|------|------|------|------|
| LP05 | LP06 | LP07 | LP08 |
| LP09 | LP10 | LP11 | LP12 |
| LP13 | LP14 | LP15 | LP16 |

= SHARED
= DEDICATED
= OFF-LINE

| LP01 | LP02 | LP03 | LP04 |
|------|------|------|------|
| LP05 | LP06 | LP07 | LP08 |
| LP09 | LP10 | LP11 | LP12 |
| LP13 | LP14 | LP15 | LP16 |

= SHARED
= DEDICATED
= OFF-LINE

| LP01 | LP02 | LP03 | LP04 |
|------|------|------|------|
| LP05 | LP06 | LP07 | LP08 |
| LP09 | LP10 | LP11 | LP12 |
| LP13 | LP14 | LP15 | LP16 |

MULTIPROCESSOR SERVERS WITH CONTROLLED NUMBERED OF CPUS

BACKGROUND OF THE INVENTION

The present invention relates to the field of computers and more particularly to multiprocessor systems having CPUs that can be pooled for system operation.

Large-scale modern data processing systems have an architecture that embodies multiple CPUs that are closely integrated to form multiprocessor systems. The CPUs in such multiprocessor systems operate under control of an Operating System. Large scale operating systems include OS/390, VM/ESA, UTS, VSE/ESA and TPF. Some multiprocessors are well-known to be have domains where each domain is assigned one instance of one operating system and is started with an IPL (initial program load) of that operating system. More than one operating system, which can be different operating systems or different instances of the same operating system, run in the multiple domains of the multiprocessor system, one operating system per domain. A feature of domains enables one or more logical processors (LPs) to be established for each domain. A logical processor is a logical entity that the operating system creates, controls and assigns to programs, frequently called independent software vendor (ISV) programs, such that each program interprets the assigned LP as its own "virtual CPU". The actual functioning of the LP may be on a single one of the multiple CPUs in the multiprocessor system or may be distributed across multiple ones of the CPUs on a time-shared basis with other LPs.

Computer users are concerned about the cost and availability of their computer systems and particularly upgrades and downgrades in the CPU configuration. A CPU upgrade is performed, among other reasons, to increase the capacity of the computer system and a CPU downgrade is performed to reduce the capacity of the system. Increasing or decreasing the capacity of a system, besides tailoring the system to fit the data processing needs of the user, also has a significant cost element since many software products that run on computer systems are frequently priced to the user as a function of the system capacity and the CPU configuration.

Typically, software licensing costs are computed based on the number of CPUs that are available to run operating systems and Independent Software Vendors (ISVs) software in the full system. In general, the software licensing costs have been charged based upon the total number of available CPUs in the full multiprocessor system since generally all such CPUs have been available to run the installed software if called upon to do so under user election and control.

In large multiprocessor computer systems that employ multiple system control programs (SCPs), CPU upgrades have been difficult to schedule because the computer user must plan an outage for all of the SCPs running on the CPU to be upgraded. With the continued exploitation of logical partitioning using multiple domain features (MDF), it has become impractical to schedule all SCPs to be down at the same time. This difficulty causes customers to delay necessary upgrades rather than attempting to schedule the full system outage. The current upgrade process includes the following steps:

1. Establish a hardware upgrade price with the hardware vendor.
2. Notify the Operating System Vendor (for example, IBM for main frame systems) to change their software charges to account for the upgraded system capacity.
3. Notify Independent Software Vendors (ISVs) to change their software charges to account for the upgraded system capacity and providing the new CPUID version code when necessary.
4. Update ISV software encoded CPUID tables.
5. Take a system outage to implement the upgrade.

Steps 1–4 are normally performed days or even weeks before the outage is taken. While few software products actually check the CPUID version code for compliance, the customer is normally required by contract to notify both the Operating System vendor and any ISVs when their licensed software will be run on a different hardware configuration. The current practice often encounters delays that are wasteful to the computer user.

The above-identified cross-referenced application describes a multiprocessor system having a plurality of CPUs that can be dynamically reconfigured between online and offline without system shutdown. The multiprocessor system is operable in different modes, including a user mode for processing user programs and a system mode for processing system programs unavailable to users. Although the dynamic reconfiguration of that cross-referenced application makes moving CPUs between online and offline modes easy, the problem still remains of isolating ISV, OS or other programs from user control such that reductions in software fees below those charged for all CPUs in the full multiprocessor configuration might be obtained.

Accordingly, and in light of the problems of prior systems, there is a need to be able to isolate programs to certain selected ones of the CPUs in a multiprocessor system and to upgrade computer CPU configurations dynamically without causing the computer user to suffer the delays and outages that have heretofore been required. It is desirable that users be able to purchase additional capacity quickly and with little effort.

SUMMARY OF THE INVENTION

The present invention is a multiprocessor system having a plurality of CPUs that are configured into different servers. The present invention partitions the total number of available CPUs into one or more smaller pools of CPUs called servers where the number of CPUs available to a server is reduced below the total number of available CPUs. Software licensing costs are thereby reduced because the number of CPUs available to run the operating system or ISV software has been reduced to the number of CPUs in the pool of the server rather than the total number of available CPUs in the multiprocessor system.

In order to enforce the isolation of CPUs required by software licensing, separate identification codes, CPUIDs, that contain unique system serial numbers are assigned to each server in the multiprocessing system. A CPUID typically includes a version code which identifies the number of CPUs allocated to the server and a unique system serial number for the server. The multiprocessor system has multiple CPUIDs, one for each server (each pool of CPUs that can execute operating systems and ISV software).

The multiprocessor system supports pools of CPUs of different types including, for example, servers, spares and coupling control pools. Of these types of pools, only the servers are assigned operating systems and ISV software on which software licensing costs are computed. Generally, a CPU that is assigned to run Coupling Control Code (CCC) is not in a server pool and can be excluded from licensing fees. Similarly, spare CPUs are not members of any server pool and can be excluded from licensing fees. Spare CPUs are available to replace CPUs in any pool. The number of CPUs assigned to the different pools is under feature control where feature control is a facility for controlling features of the multiprocessor system. The feature control facility is not accessible by end users of the multiprocessor system. CPU pool assignment for each domain is done by the Presentation Element Platform (PEP) and is not viewable from the Hardware Management Console (HMC). The type of operating system permitted to run in a CPU pool is also under feature control.

The multiprocessor system can switch between online and offline without system shutdown. The multiprocessor system is operable in different modes, including a user mode for processing user programs and a system mode for processing system programs unavailable to users. Although the multiprocessor system is capable of being shutdown to terminate operation and permit reconfiguration during or after a shutdown, the multiprocessor system of the present invention includes a dynamic reconfiguration subsystem for reconfiguration without shutdown.

The dynamic reconfiguration subsystem includes a service processor having a feature file for identifying a current online number corresponding to a current number of online CPUs, a current offline number corresponding to a current number of offline CPUs and an update number corresponding to changes to be made in the current online number and the current offine number. A reconfiguration control unit is provided for reconfiguring CPUs in the multiprocessor system without being shutdown that includes a store for storing configuration code in response to the feature file, a system state execution unit for executing the configuration code to form configuration control information and decoder means for decoding the control information to change the current number of online CPUs and the current number of offline CPUs by the update number.

The present invention allows the definition of offline logical processors (LPs) which may be brought online when the reserved capacity is made available. The total number of domain LPs, including offline LPs, may not exceed the total number of physically installed CPUs. However, when the domain is activated, the number of online LPs per domain may not exceed the number of customer purchased non-coupling control CPUs.

The actual upgrade process is controlled to return the correct CPUID including version code to the SCP when it is retrieved with the Store CPUID (STIDP) instruction.

During SCP initialization, a STIDP instruction is performed to retrieve the CPUID and save it in storage. IBM SCPs such as OS/390 use this storage location to establish a unique dynamic path array identifier, determine recovery actions, and establish future Service Call Logical Processor (SCLP) actions. ISV software products (in particular those products that check their encoded CPUID tables for compliance) issue their own STIDP when that ISV software is initialized.

The CPUID contains each vendor's model number (for example, Amdahl 700) as well as a version code which identifies a specific server (for example, x'58'=785). In the case of the Amdahl MGS 700, the X'5' indicates that the CPUs are running at full speed and the X'8' defines that eight physical CPUs are installed and available for customer use.

The foregoing and other objects, features and advantages of the invention will be apparent from the following detailed description in conjunction with the drawings.

DETAILED DESCRIPTION

Figure 1:
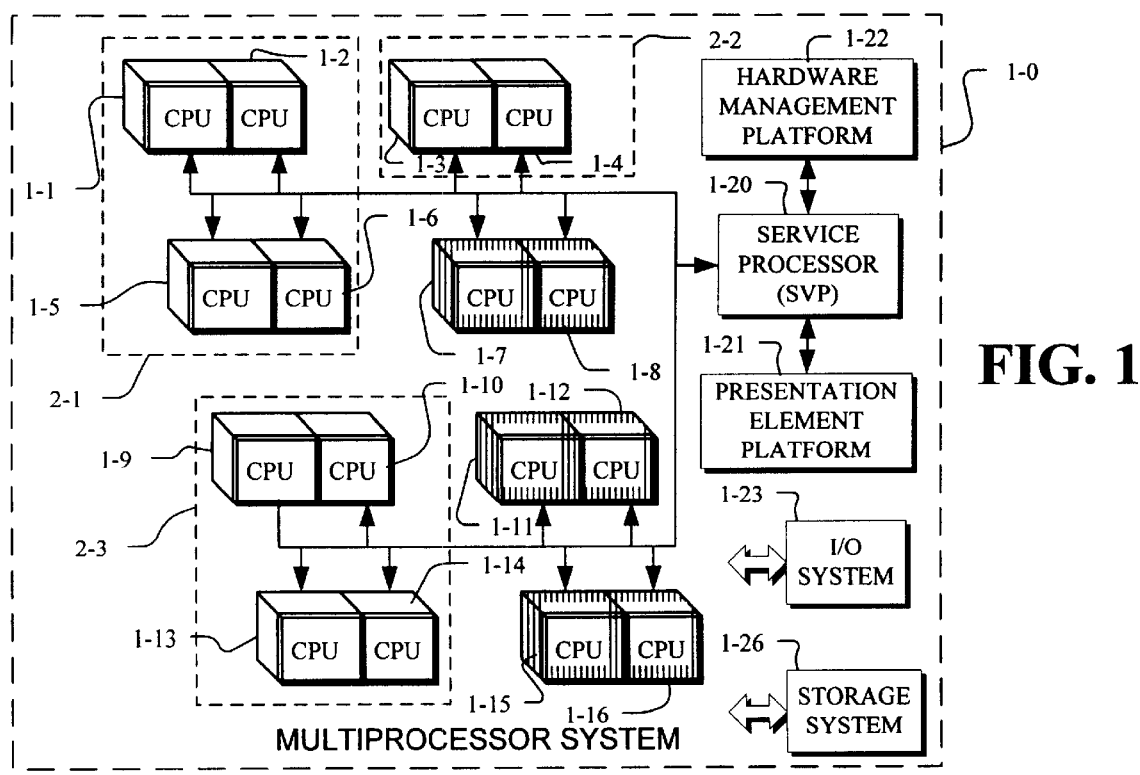
FIG. 1 depicts a multiprocessor system having a current CPU configuration with CPUs arranged in servers that include isolated pools of CPUs.

Multiprocessor Systems—FIG. 1

In FIG. 1, a multiprocessor system 1-0 is shown, including a plurality of CPUs 1, specifically including CPUs 1-1, 1-2, . . . , 1-16. The multiprocessor system 1-0 includes a Service Processor (SVP) 1-20 which controls the configuration and maintenance of the multiprocessor system 1-0. The multiprocessor system 1-0 also includes a Presentation Element Platform (PEP) 1-21 which provides an interface to the service processor 1-20, and includes a hardware management platform 1-22 for user hardware management. Additionally, the multiprocessor system 1-0 includes an I/O system 1-23 for providing the CPUs 1 with I/O storage and includes a storage system 1-26 for providing the CPUs 1 with main storage. The storage system 1-26 stores software executed by the CPUs 1 including, for example, operating system programs and user application programs. The operating system programs and user application programs (including ISV programs) are typically licensed to the multiprocessor system user and under terms that require license fees based upon the number of CPUs online and available to execute the programs.

In the FIG. 1 example, ten of the sixteen CPUs are online, specifically CPUs 1-1, . . . , 1-6, 1-9, 1-10, 1-13 and 1-14. The other CPUs, namely, 1-7, 1-8, 1-11, 1-12, 1-15 and 1-16 are off-line. Only the online CPUs are capable of executing the operating system programs and user application programs.

Typical multiprocessor CPU boards contain two CPUs so that the multiprocessor system can be physically populated with two, four, . . . , sixteen CPUs. However, a user (customer) may only wish to initially purchase a machine that contains, for example, three or four useable CPUs and purchase more useable CPUs at a later time. Later on, the customer will be able to dynamically upgrade the multiprocessor system 1-0 to the maximum number of useable CPUs that are physically installed in the full multiprocessor system 1-0.

Dynamic CPU Reconfiguration is the ability to increase or decrease the number of CPUs a customer has purchased and are physically available for use without requiring a system reset. This dynamic reconfiguration capability increases the availability of the multiprocessor system. With this ability, customers are able to purchase additional CPUs in a very short period of time without unwanted downtime.

In FIG. 1, the CPUs 1-1, . . . , 1-16 are additional organized into pools that form servers. Server 2-1 includes a pool of CPUs that includes CPUs 1-1, 1-2, 1-5 and 1-6. Server 2-2 includes CPUs 1-3 and 14. Server 2-3 includes CPUs 1-9, 1-10, 1-13 and 1-14. The offline CPUs 1-7, 1-8, 1-11, 1-12, 1-15 and 1-16 are not in any pool.

Figure 2:
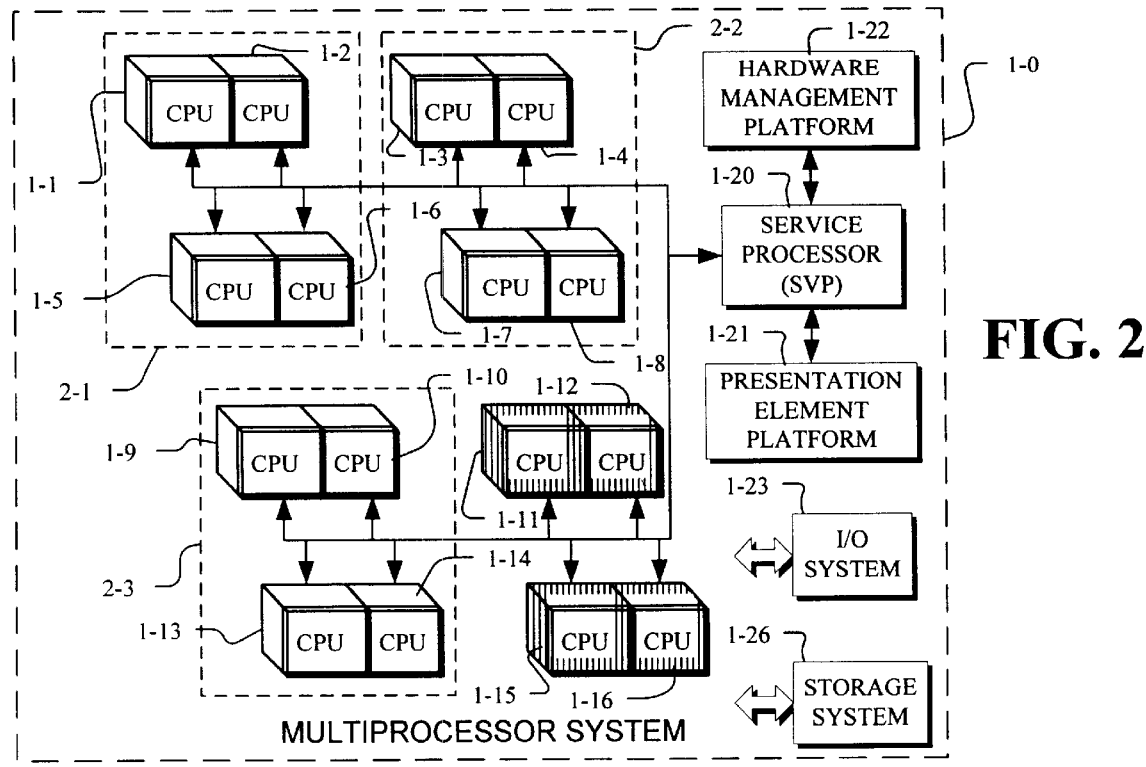
FIG. 2 depicts a multiprocessor system having a new CPU configuration in reconfigured servers.

Reconfigured Multiprocessor System—FIG. 2

In FIG. 2, the multiprocessor system 1-0 of FIG. 1 has been reconfigured to change the offline CPUs 1-7 and 1-8 of FIG. 1 to online in FIG. 2. The change of the configuration from FIG. 1 to the configuration of FIG. 2 occurs dynamically without necessity of shut-down of the multiprocessor system 1-0. Also, the server 2-2 of FIG. 1 has been reconfigured to include CPUs 1-7 and 1-8 as well as CPUs 1-3 and 14 within the server pool. Reconfigured Multiprocessor System—FIG. 3

Figure 3:
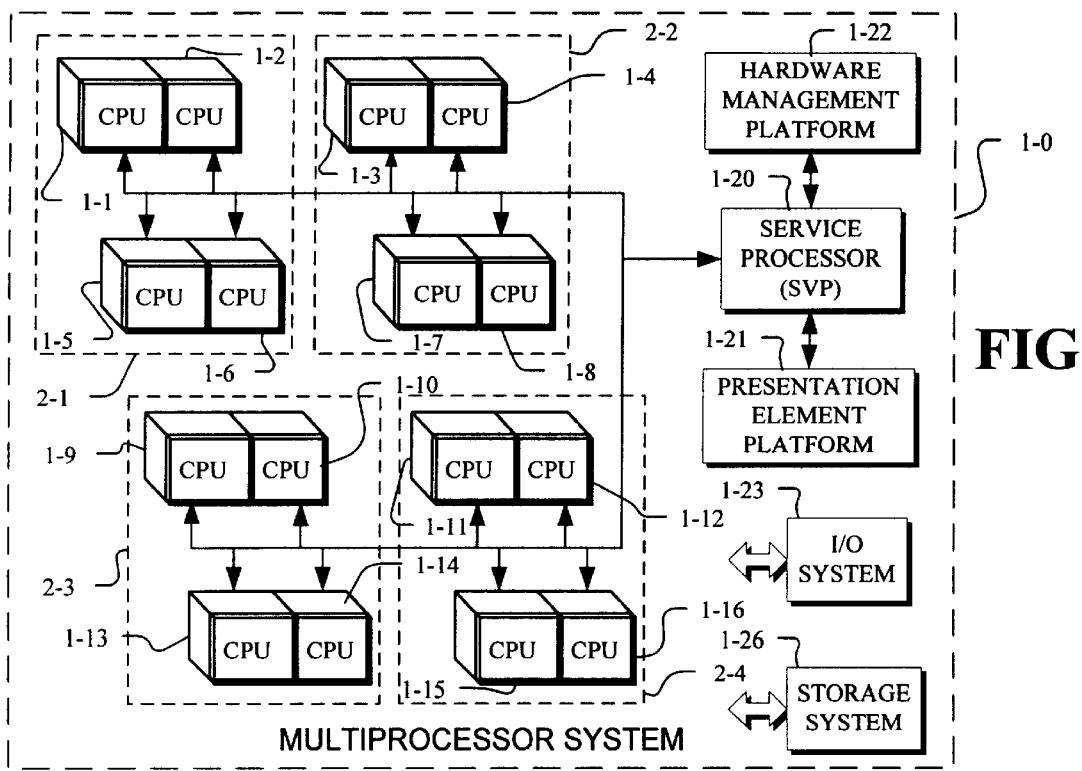
FIG. 3 depicts a multiprocessor system having a new CPU configuration in reconfigured servers.

In FIG. 3, the multiprocessor system 1-0 of FIG. 1 has been reconfigured to change the offline CPUs 1-11, 1-12, 1-15 and 1-16 of FIG. 2 to online in FIG. 3. The change of the configuration from FIG. 2 to the configuration of FIG. 3 occurs dynamically without necessity of shut-down of the multiprocessor system 1-0. Also, the server 2-4 of FIG. 3 has been configured to include CPUs 1-11, 1-12, 1-15 and 1-16 within a pool as server 2-4.

Figure 4:
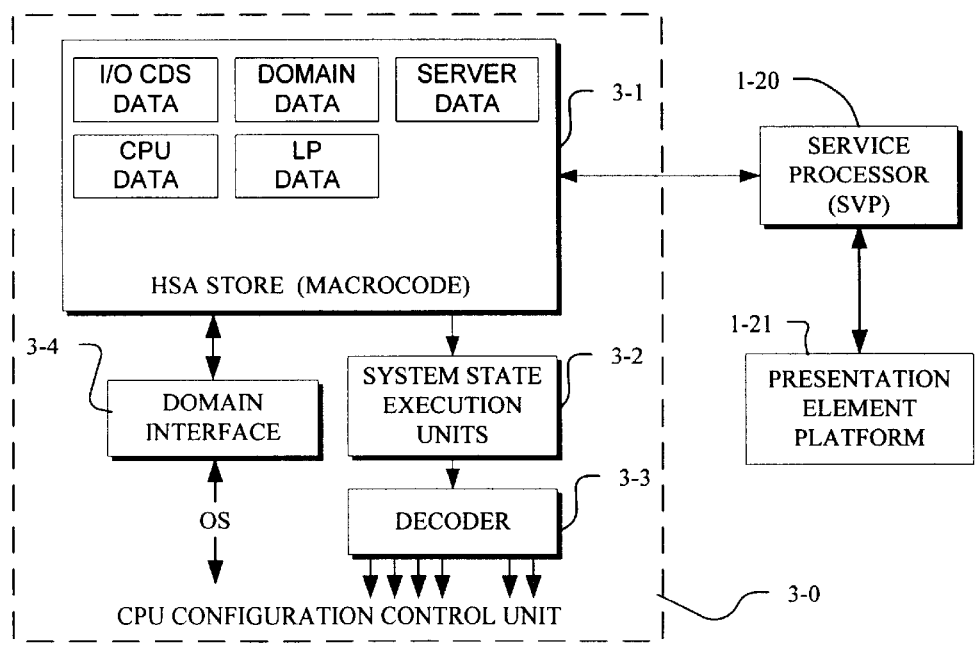
FIG. 4 depicts a CPU configuration control subsystem within the multiprocessor system of FIG. 1, FIG. 2 and FIG. 3.

CPU Reconfiguration Control Unit—FIG. 4

In FIG. 4, the CPU configuration control unit 3-0 operates in response to a feature file in the service processor 1-20 for dynamically configuring the multiprocessor system 1-0. The feature file includes information identifying a current online number corresponding to the current number of online CPUs, a current offline number corresponding to a current number of offline CPUs and an update number corresponding to changes to be made in the current online number and the current offline number. In the FIG. 1 example, the number of online CPUs is ten and the number of offline CPUs is six. In changing from the FIG. 1 configuration to the FIG. 2 configuration, the update number is two. The update number adds two to the online number and subtracts two from the offline number.

While an increase in online CPUs and a decrease in off-line CPUs is contemplated going from the FIG. 1 configuration to the FIG. 2 configuration, the present invention works equally well in either direction. Namely, if the current configuration is that of FIG. 2 and the new configuration is that of FIG. 1, then the update number remains two, but the update number is subtracted from the online number and is added to the offline number.

Also in FIG. 4, the feature file contains the server data and the CPU data that identifies the CPUs in each server 2-1, 2-2, 2-3 and 2-4. The feature file loading and control is not accessable or useable by the end user of the multiprocessor system 1-0 but can only be accessed by the vendor of the multiprocessor system 1-0 through customer representatives or other vendor access. Accordingly, the assignment of CPUs to pools to establish servers cannot be modified directly by the user of the multiprocessor system 1-0 and hence ISVs and others can rely upon the limitations in the size and capacity of servers in the multiprocessor system 1-0 for purposes of licensing fees, performance allocation and control.

Within FIG. 4, the user of the multiprocessor system 1-0 is able to establish domains through control of the domain data, allocate logical processors (LPs) in the domains and allocate channels in the I/O system through I/O CDS data.

Figures 5, 6, 7:
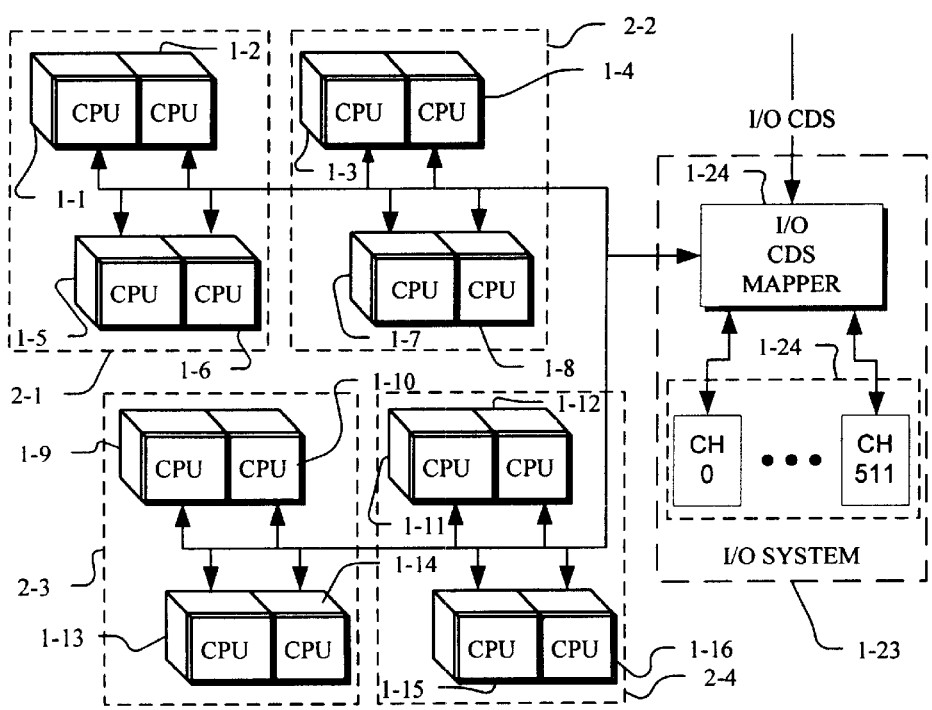
FIG. 5 depicts further details of the I/O system within the multiprocessor system of FIG. 1, FIG. 2 and FIG. 3.
FIG. 6 depicts the logical processor (LP) configuration of the FIG. 1 system.
FIG. 7 depicts the logical processor (LP) configuration of the FIG. 2 system.

Multiprocessor I/O Configuration—FIG. 5

In FIG. 5, the connection of the CPUs 1, including CPUs 1-1, 1-2, . . . , 1-16 connect to the I/O system 1-23. The I/O system 1-23 an I/O CDS mapper 1-24 that determines the connections of each domain to particular ones of the 512 channels 1-25. The I/O CDS mapper 1-24 maps the domains and channels 1-25 under control of the I/O CDS data from the HSA store 3-1 of FIG. 4.

LP Configuration—FIG. 6.

Each of the 1 to 15 domains can have from 1 to 16 LPs. These LPs are dispatched on CPUs 1-1, . . . , 1-16 of the server to which the domain is assigned in FIG. 1, FIG. 2 and FIG. 3. Dedicated LPs are dispatched 100% of the time on a dedicated CPU while shared LPs of each domain are dispatched a portion of the time on a shared CPU. Each domain typically can have separate system control programs SCPs which each control operation in a well-known manner with a view of the multiprocessor system which appears to be exclusive to the SCP. Since each SCP runs independently, it is difficult to control all of the SCPs such that they can be shut down simultaneously in order to shut down the entire multiprocessor system 1-0.

In FIG. 6, the state of each of the logical processors LP01, . . . , LP16 is either SHARED, DEDICATED or OFF-LINE. FIG. 6 represents the state of the logical processors of server 2-2 in FIG. 1, by way of example, where the dedicated logical processors are LP01 and LP02. The off-line logical processors in FIG. 1 are LP03, . . . , LP16 and no logical processors are shared.

Figure 8:
FIG. 8 depicts a new logical processor (LP) upgrade configuration.
Figure 9:
FIG. 9 depicts a new logical processor (LP) upgrade configuration with a new dedicated LP.

New Upgrade Configurations—FIG. 7, FIG. 8 and FIG. 9

In FIG. 7, a new upgraded configuration of the domain logical processors executing on the CPU configuration of the FIG. 2 multiprocessor system is shown. In FIG. 7, the LP03 and LP04 logical processors have been moved from the off-line state of the FIG. 6 configuration for the FIG. 1 multiprocessor system to a shared configuration. The logical processors LP01 and LP02 remain dedicated.

In FIG. 8, the logical processor LP03 is reconfigured relative to the FIG. 7 configuration to a DEDICATED status. The logical processors are LP01 and LP02 remain dedicated and the logical processor LP04 remains shared.

In FIG. 9, the logical processor LP05 is changed from the off-line status of FIG. 8 to a shared online status. The logical processors LP01, LP02 and LP03 remain dedicated and the logical processor LP04 remains shared.

Figure 10:
FIG. 10 depicts a new logical processor (LP) downgrade configuration.

Downgrade Configuration—FIG. 10.

In FIG. 10, the logical processor LP05 is moved from the online status as shown in the FIG. 9 configuration to an off-line status. LP03 is moved from dedicated to shared. The logical processors LP01 and LP02 remain dedicated and the logical processor LP04 remains shared.

General Reconfiguration Operation

The total number of domain LPs, including offline LPs, may not exceed the total number of physically installed CPUs. However, when a domain is activated, the number of online LPs per domain may not exceed the number of customer purchased non-ICS CPUs.

Once a dynamic upgrade is requested and approved, a new feature file is created and downloaded by an authorized technician of the multiprocessor vendor. This updated feature file is then installed concurrently on the server to be upgraded. After the upgrade of the feature file is complete, the additional CPU capacity is immediately placed in the shared CPU pool for non-specific domain CPU requests.

Existing shared LPs in currently running domains will then have access to the extra CPU capacity. Although their computed share will remain the same, the amount of shared CPU resource available to each domain and its LPs has increased which will result in more effective system capacity per domain.

If the number of existing LPs restricts consumption of the new CPU resource, those predefined offline LPs may be brought online via an SCP operator command such as an OS/390 "CF CPU(x),ONLINE" or VM/ESA "VARY ON PROC(x)". The new CPUs will then be used to satisfy the demand generated by these new online LPs. Additionally, the new CPU may be moved from the shared CPU pool to provide backing for a dedicated LP. If offline LPs were not defined in the activation profile, a domain reactivation is required. In this case, dynamic reorganization may be disruptive to that domain. Once a dynamic upgrade is completed, the activation profile should be updated to retain the new domain configuration.

If dynamic upgrade is used to dynamically increase capacity to handle a disaster, once the disaster is resolved the system may also be dynamically downgraded. The following steps may be used to perform a dynamic downgrade:

1) Deactivate the backup domains or configure LPs offline as required.
2) Dynamically downgrade the system by installing a new feature file.
3) Modify and save changed domain profiles.

Software asset management requires that the CPUID be accurate. When a Dynamic CPU Upgrade is performed, the CPUID, including the version code, is immediately updated to accurately return the current model. Until the domain is re-IPLed, there will be a mismatch between the CPUID saved in SCP storage during initialization and the CPUID returned by a STIDP.

Even with dynamic CPU reconfiguration, the user still has the responsibility of notifying all software vendors that an upgrade will take place. The Operating System vendor should be advisor that a dynamic upgrade will be performed so that they will better understand the environment in case a software problem does arise.

Detailed Dynamic CPU Reconfiguration Algorithm

The following steps present the algorithm for dynamic reconfiguration.

1. The multiprocessor user (customer) may specify offline LPs when creating and activating domains. The total number of LPs should not exceed the total number of physically installed CPUs. The number of LPs may be less than the total number of physically installed CPUs. This operation requires changes to the profiles on the Presentation Element Platform (PEP). A new field is added to the profiles to hold the number of processors that are to be offline at activation time. The number of processors field holds the number of offline plus online processors. The number of processors is checked to ensure that it does not exceed the number of physically installed CPUs. A message is issued if the user exceeds this number. A field is added to the processor characteristics profile edit frame to show the number of purchased CPUs. The affect partition controls frame shows the number of LPs actually being used for active partitions and the number in the profile for inactive partitions.

A new field in the profiles holds the number of offline processors. Due to an incompatibility between the PEP and the Hardware Management Console (HMC), in order to change the profiles, a user uses Distributed Console Access Facility (DCAF) to get to the PEP screens instead of using the HMC screens directly. Without the number of offline field, for each partition, the total number of LPs (offline and online) would have to equal the number of physically installed CPUs. This relationship would create many offline LPs that are not necessary and would create a big problem for the scheduler because the scheduler would be required to look at all of these LPs all of the time. Such operation would also create a performance problem. Also, without the number of offline field, field domain operators can do a CF CPU online for any of these offline LPs. This operation could also create performance problems. It is better to allow the system operator to limit the number of offline LPs to the number that might actually be used at upgrade time.

With the addition of this new "number of offline processors" field, users modify their profiles after every upgrade or down-grade. Having this offline processors field is a feature users may use even if they aren't going to make use of dynamic reconfiguration. The profile contains a field for the number of dedicated processors. The user can specify that all LPs are dedicated even the offline ones. The scheduler assigns dedicated processors in first-come first-serve order. So, the LPs that are brought online first get the dedicated CPUs if the user has specified fewer dedicated than there are LPs in total.

2. Macrocode has control blocks available for the new CPUs that may be added for an upgrade. Macrocode will set up the number of control blocks for a partition at creation time based on the number of logical processors specified in the create partition Request/Response Control Block (RRCB). The create partition RRCB is changed for dynamic reconfiguration so that the total number of logical processors and the number of offline logical processors will be included. At activation time, Macrocode will only bring online the total number of logical processors minus the number of offline logical processors.

3. The field engineer puts the machine into Concurrent Maintenance (CM) mode so that dynamic installation of the features tape can be done.

4. From SVP, the field engineer installs a new features tape from the Generation Frame (GE) using the new dynamic reconfiguration option. This new features tape specifies the number of CPUs that are purchased whether it's more or less than before. The SVP decodes the new features tape and checks it. If there are some differences above and beyond the change in number of CPUs, then it is rejected. Also, if there is no change in the number of CPUs, a warning will be issued but the user can continue if desired.

5. To ensure that the customer has stopped use of the CPUs that are no longer purchased whenever features are being down-graded, the SVP will issue an High Level Command (HLC) to the PEP querying whether there will be enough CPUs left after the down-grade to prevent running degraded based on the current LP needs. The PEP will in turn need to query Macrocode. Note, that this needs to be a two HLC handshake. The first HLC queries the Macrocode. The response to this HLC is sent back immediately from the PEP. Then, the PEP queries macrocode for the information. Then, the PEP sends the information back in a second HLC. This sequence is necessary in order to prevent timing out on the first HLC while waiting for Macrocode to respond. If the FE chooses to continue with a downgrade after being warned about a mismatch in the number of LPs and CPUs, then the machine may run degraded. For performance reasons, the customer should reduce the maximum number of shared domain LPs to the number of shared physical processors. Since multiple shared LPs con run on fewer shared CPUs, this is not mandatory, but it is suggested.

6. From the SVP, the FE activates the new features without having to do an Initial Microcode Program Load (IMPL) of the system. The SVP updates the features control data on the hard drive and in memory and sets new CPUIDs into the HSA table. CPUFIRM uses the new CPUID from the next Store CPUID. A detailed log containing machine configuration information is retained. Service Tools need this information just like they do at IMPL time.

7. The dynamic reconfiguraiton feature activation causes a new HLC to be broadcast to the PEPs specifying that the number of purchased CPUs has changed.

8. The PEP syncs itself with the SVP. It updates all of it's information on how many CPUs are installed and purchased. It logs a message in the event log to track the fact that the number of purchased CPUs has changed.

9. The PEP sends Macrocode a new RRCB telling Macrocode that the number of purchased CPUs has changed. The PEP also sends this RRCB to Macrocode whenever the SVP is IPLed just in case an IPL has caused this message to be lost.

10. Macrocode issues a diagnose command to the SVP to obtain the maximum number of CPUs allowed by feature control data. Macrocode also issues this diagnose whenever the primary PEP has switched. This will cover the case where the message to Macrocode may have been lost due to a primary PEP switch. Macrocode retains this data in a secure manner.

11. Macrocode will only schedule CPUs that are within the maximum number allowed by feature control data. The 'extra' CPUs are put in 'spare' state so that they can be used for dynamic CPU reconfiguration (DCR).

12. Typically, all of the physically installed CPUs are reset at reset power on of the system so there is nothing needed to get any newly purchased CPUs reset.

13. Macrocode schedules work on the new CPUs if there are LPs already available to use them in the case of an upgrade. In the case of a down-grade, Macrocode stops use of the CPUs that are no longer purchased. This operation may cause the machine to run degraded if there aren't enough CPUs for all of the LPs that need them. The Macrocode scheduler will do LP-squeeze. Also, a degradation machine check will be generated which MVS logs.

14. Macrocode issues an RRCB to all PEPs indicating that a DCU/DCR operation took place. This RRCB has the new mapping table for Extended Virtual Machine (EVM) to System CPU addresses.

15. Macrocode sends RRCB(s) to all of the PEPs to indicate that the operator MAY vary the new CPU online to a partition if it is an upgrade and the partition has offline LPs that could be brought online. Since LPs can float across shared CPUs, there may be no need to bring any more LPs online. The PEP will receive as many RRCBs as there are partitions with LPs to be brought online. The PEP will issue a pop-up messages to the user and issue log messages.

16. Macrocode sends an RRCB to all of the PEPs indicating that the machine is running degraded if this has happened due to the down-grade. The PEP will issue a pop-up message to the user and log a message. There needs to be an indication in the RRCB as to whether this is serious and involves dedicated processors that aren't getting a full CPU (for example, 6 dedicated LPs from the same partition sharing 4 CPUs) or not so serious (for example, 6 LPs from the same partition sharing 4 CPUs without any being dedicated).

17. For an upgrade, if so prompted and it is necessary, an operator issues a CF CPU (x) online from MVS, causing an SCLP CF CPU to be sent to Macrocode. Macrocode starts scheduling more LPs on the physical CPUs. If the user has specified that the new LPs should be dedicated and there are enough CPUs to go around, the LPs will be made dedicated. The SCLP CF CPU may fail if there aren't enough CPUs to go around.

18. The customer may wish to change the number of offline processors in the profiles so that the desired number are brought online when the partition is re-activated. If the user doesn't change the profiles, the next partition activation may fail.

19. The customer may wish to change the number of dedicated CPUs for a given partition using the affect partition controls frame. It should be noted that the CPUID is only stored in the LPB at domain activation and should always reflect the current version of the system. The LPB CPUID should not change for an already activated domain.

EXAMPLES

Based on a multiprocessor system that has six physically installed CPUs.

Example 1

1. User specifies 1 partition with 6 processors, 2 offline, 4 dedicated in the profile. Purchased=4.

Editing the profile causes No warning message.

Partition activation causes a create partition RRCB to be sent to Macrocode. 6 processors, 2 offline, 4 dedicated are specified.

Macrocode receives the RRCB. Macrocode will put 4 LPs online and 2 offline.

The user may upgrade the machine to 6 CPUs.

Upon doing so, still only 4 CPUs are being used until a CF CPU ON command is given from MVS. This causes an SCLP CF CPU to be sent to Macrocode. At that time, the newly on-lined LP's start to be scheduled.

The user can do an affect partition control to change the number of dedicated CPUs if desired.

If the user reactivates the partition, 4 LPs will be put online and 2 offline. The user can and should edit the profile so that 6 LPs will be brought online automatically.

The user can now down-grade the machine back to 4 CPUs.

If that is done, and no LPs were taken offline using the CF CPU OFF command from MVS, then a warning will be issued at feature installation time, warning the user that the machine will run degraded if he/she continues.

Macrocode will put two of the CPUs to sleep.

The Macrocode scheduler will do LP-squeeze. Also, a degradation machine check will be generated which MVS probably just logs.

Example 2

2. User specifies 1 partition with 4 processors, 0 offline, 4 dedicated in the profile, purchased=4.

Editing the profile to say 4 processors causes NO warning message.

Partition activation causes a create partition RRCB to be sent to Macrocode. 4 processors, 4 dedicated, 0 offline are specified.

Macrocode receives the RRCB. You'll end up with 4 online LPs, 0 offline.

The user may upgrade the machine to 6 CPUs.

Upon doing so, still only 4 CPUs will be used. The user hasn't specified extra LPs to run on the new CPUs so he can't make use of the new CPU power.

If the user reactivates the partition, only 4 LPs will be put online since this is the number in the profile.

The user could activate another partition to make use of the extra CPUs.

Example 3

3. The user specifies 1 partition, 6 processors, 2 offline, 0 dedicated in the profile. Purchased=4.

Partition activation causes a create partition RRCB to be sent to Macrocode. 6 processors, 2 offline, 0 dedicated are specified.

Macrocode receives the RRCB. Macrocode will put 4 LPs online and 2 offline.

The user may upgrade the machine to 6 CPUs.

Upon doing so, still only 4 CPUs are being used (an LP can use at most 100% of a CPU) until a CF CPU ON command is given from MVS. This causes an SCLP CF CPU to be sent to Macrocode. At that time, the newly on-lined LPs start to be scheduled.

The user can do an affect partition control to change the number of dedicated CPUs if desired.

If the user reactivates the partition, 4 LPs will be put online unless the user edits the profile to say that their are 0 offline.

The user can now down-grade the machine back to 4 CPUs.

If that is done, and no LPs were taken offline using the CF CPU OFF command from MVS, then a warning will be issued. This warning will be a gentle warning because there are enough CPUs for the LPs to share although each LP will be getting less than 100% of a CPU.

Macrocode will put two of the CPUs to sleep.

The 6 LPs will be online sharing 4 CPUs.

Example 4

4. The user specifies 2 partitions, purchased=4.
Part 1: 4 processors, 0 offline, 0 dedicated in the profile Part 2:4 processors, 2 offline, 2 dedicated in the profile Partition activation for Part 1 causes a create partition RRCB to be sent to Macrocode. 4 processors, 0 offline, 0 dedicated are specified.

Macrocode receives the RRCB. Macrocode will put 4 LPs online.

Partition activation for Part 2 causes a create partition RRCB to be sent to Macrocode. 4 processors, 2 offline, 2 dedicated are specified.

Macrocode receives the RRCB. Macrocode will put 2 more LPs online and 2 LPs offline. There are a total of 6 LPs online and 2 LPs offline now and there are 4 CPUs available. Two of the LPs have dedicated CPUs and the rest are sharing the other two CPUs.

The user may upgrade the machine to 6 CPUs.

Upon doing so, all 6 CPUs are being used. A CF CPU ON command is not necessary since there are enough LPs already online to make use of the new CPUs. However the user could do a CF CPU ON for the two offline LPs if desired. It will just add to the number of LPs sharing the CPUs.

The user can do an affect partition control to change the number of dedicated CPUs if desired.

If the user reactivates the partitions, 6 LPs will be put online and 2 LPs will be offline. The user should edit the profile if he/she doesn't want any offline LPs.

The user can now down-grade the machine back to 4 CPUs.

If that is done, and no LPs were taken offline using the CF CPU OFF command from MVS, then a warning will be issued. This warning will be a gentle warning because there are enough CPUs for the LPs to share although each LP will be getting less than 100% of a CPU.

Macrocode will put two of the CPUs to sleep.

The 6 LPs will be online. 4 of the LPs will be sharing 2 CPUs and 2 LPs will have dedicated CPUs.

Figure 11:
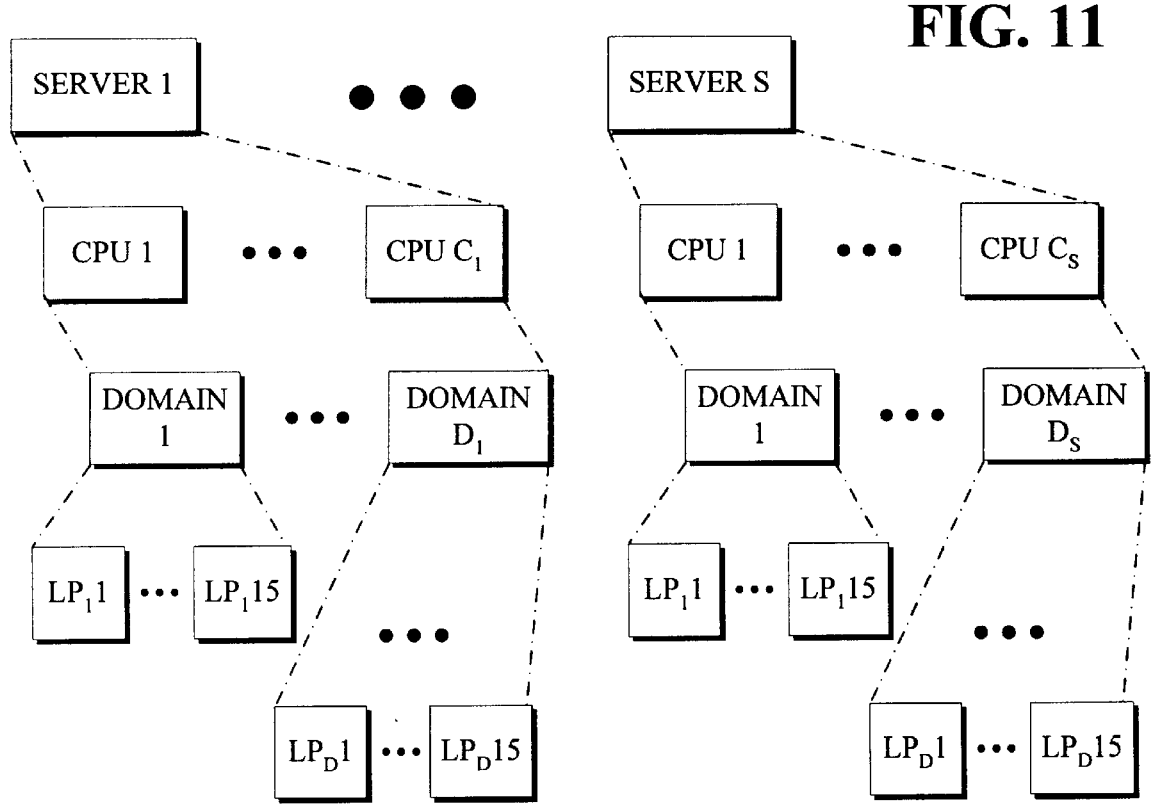
FIG. 11 depicts the relationship between servers, CPUs, domains and logical processors in the multiprocessor system of FIG. 1, FIG. 2 and FIG. 3.
Figure 12:
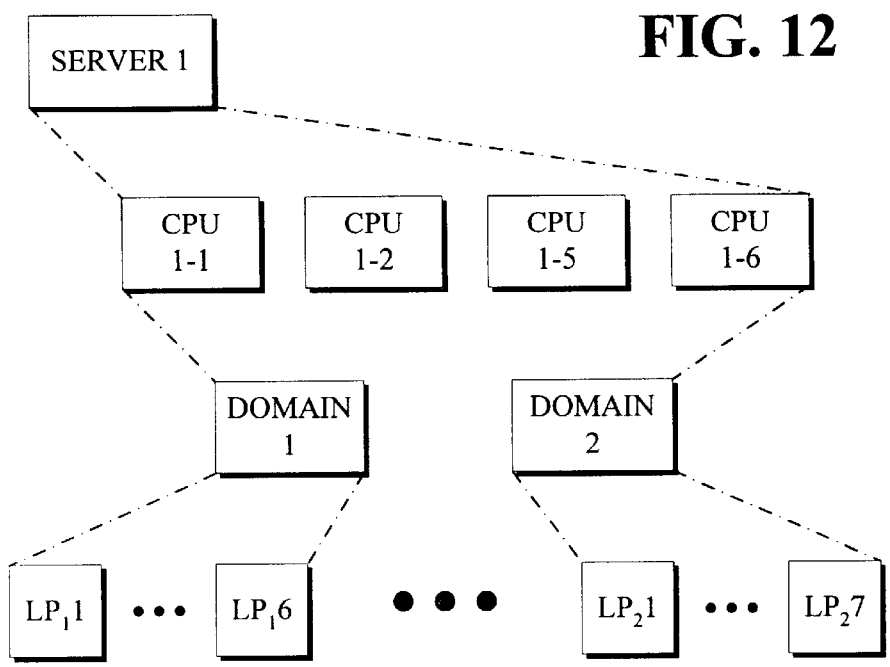
FIG. 12 depicts the configuration for one server in the multiprocessor system of FIG. 1, FIG. 2 and FIG. 3 showing the CPUs and examples for the configuration of domains and logical processors in the multiprocessor system of FIG. 1, FIG. 2 and FIG. 3.

Server Configurations—FIG. 11 and FIG. 12

In FIG. 11, further details of the configuration of servers 2 in the multiprocessor systems 1-0 of the present invention are shown. In FIG. 11, the servers 2 include servers 1, . . . , S where in the 16 CPU embodiment described, S is a maximum of 15. Each of the servers 2 includes one or more CPUs 1 including CPUs 1, . . . , $C_s$, where for server 1, $C_s=C_1$, and so on where for server S, $C_s=C_S$. Each of the values $C_1, \ldots, C_s, \ldots, C_S$ is some value from 1 to 15 for the 16 CPU embodiment described.

In FIG. 12, an example of the FIG. 11 further details of the configuration of servers 2 in the multiprocessor systems 1-0 of FIG. 11 is shown for the server 2-1 of FIG. 1. In FIG. 12, the server 2-1 includes CPUs 1, . . . , $C_1$ where for server 2-1, $C_1=4$ for the CPUs 1-1, 1-2, 1-5 and 1-6. Further in the FIG. 12 example, the server has been configured with two domains, DOMAIN 1 and DOMAIN 2. Still further, DOMAIN 1 has been configured with six LPs, namely LP1, . . . , LP6 and DOMAIN 2 has been configured with seven LPs, namely LP1, . . . , LP7.

Multiple Server Facility (MSF) System Level Specification

Since software licensing costs are computed based on the number of CPUs that are available to run operating systems and ISV software, the present invention partitions the total number of available CPUs into one or more smaller pools of CPUs called servers where the number of CPUs available to a server is reduced below the total number of available CPUs. Software licensing costs are thereby reduced because the number of CPUs available to run the operating system or ISV software has been reduced to the number of CPUs in the pool rather than the total number of available CPUs in the multiprocessor system.

MSF supports pools of CPUs for different types of operations. The different types of operations include, for example, servers, spares and Coupling Control Code (CCC). Of these types of pools, the servers are the ones to which operating systems and ISV software are assignable and which are, therefore, the ones upon which software licensing costs are computed. Generally, a CPU that is assigned to run Coupling Control Code (CCC) is not in a server pool and can be excluded from licensing fees. Similarly, spare CPUs are not members of any server pool and and can be excluded from licensing fees. Spare CPUs are available to replace CPUs in any pool. The number of CPUs assigned to the different pools is under feature control where feature control is a facility for controlling features of the multiprocessor system. The feature control facility is not accessible by end users of the multiprocessor system. CPU pool assignment for each domain is done by the Presentation Element Platform (PEP) and is not be viewable from the Hardware Management Console (HMC). The type of operating system permitted to run in a CPU pool is also under feature control.

In order to enforce the isolation of CPUs required by software licensing, separate identification codes, CPUIDs, that contain unique system serial numbers are assigned to each server in the multiprocessing system. For example, a CPUID typically includes a version code which identifies the number of CPUs allocated to the server and a unique system serial number for the server. The multiprocessor system has multiple CPUIDs, one for each server (each pool of CPUs that can execute operating systems and ISV software).

The feature control file specifies the number of CCC CPUs, the number of server CPUs and the number of spare CPUs which numbers sum to the total number of CPUs in the multiprocessor system. There is one size field per server pool where the sum of the size fields for all servers equals to N (the number of purchased processors).

Dynamic CPU upgrade and downgrade may be done between CPU pools with the feature file. The CPUID of each server formed by a CPU pool is defined by the feature file. Individual CPUs or CPUs in a server may be degraded. The speeds (degrade values) of CPUs may have different values in different CPU servers. The speeds (degrade values) of CPUs within a particular server are identical. A spare CPU, if present in the multiprocessor system configuration, may be used to replace any CPU in any server. The spare CPU must be set to the same speed as the CPU it has replaced in the CPU server.

Although a multiprocessor end user may run CCC in a server pool rather than on a dedicated CPU dedicated to CCC, such operation subjects the running of CCC to standard server operating system licensing fees.

There are one or more active logical Input/Output Configuration Data Sets (IOCDSs) in the multiprocessor system for controlling the mapping of I/O channels among the domains.

NodeID—The System Hardware Number NodeID is selected by the system (the first one defined).

Channel Subsystem Call (CHSC), Service Call Logical Processor (SCLP), ESCON Multiple Interface Facility (EMIF) & Dynamic Reconfiguration Memory (DRM) operations are not restricted to those facilities available to a server.

Diagnose 204 and Request Machine Information (RMI) information may be provided for the domain, pool or entire system as specified by the customer in the domain profile. The information returned by the Diagnose 204 interface is under operator control such that it provides the following scope of reporting options:

a) Information for all CPUs in the system.
b) Information for all CPUs in a general pool and the coupling facility pool.
c) Information for only those CPUs in the pool in which the domain is allocated.
d) Information for only the domain that issued the diagnose 204.

ISV Software Checking of CPUID

To check the CPUID for licensing compliance the ISV software periodically does a STIDP (Store CPU ID). The STIDP instruction returns the CPUID of the MSF server on which it is installed. The ISV program then accesses a table to obtain a coded table entry provided by the ISV as part of the ISV software purchase and installation process. The encoded table entry is decoded by the ISV software and compared with the CPUID to check for compliance. By checking for compliance the ISV ensures that the customer is running its software only on servers licensed to run that ISV software. If not in compliance, the ISV software logs the non-compliance and takes any other action that the ISV software vendor has embedded in the software. For example, a warning of the license violation is displayed and/or ultimately the ISV software is disabled or otherwise restricted from full performance until the license violation is corrected.

Multiple Server Facility Algorithm

1. The feature file specifies a count, operating system mode, and system serial number for each of servers. The sum of the counts equals N where N is the total number of authorized CPUs in the multiprocessor system. Changes in CPU counts can be activated dynamically.

2. Changes in the operating system mode and system serial number of an existing server are activated statically. New CPU servers may be added dynamically. There need only be one model number on the features file. The model number does not have any indication of CPU number or of whether the machine includes a coupling facility (CCC) or multiple servers since these determinations in the feature file are separately determined.

3. At dynamic features file installation, a check is made to ensure that the number of CPUs takes into account all CPUs that are in the full multiprocessor system.

4. A dynamic features installation that is a down-grade in the number of CPUs checks to see if the server will enter a degraded mode once the features are activated. The check consists of an High Level Command (HLC) to the PEP, a response to the HLC, a Request/Response Control Block (RRCB) from the PEP to Macrocode, a response to the RRCB with the information from Macrocode, and then an HLC from the PEP to the Service Processor (SVP) with the information. The information passed back accounts for all servers and CPUs in the multiprocessor system. There can be degradation for the CCC CPUs and not the servers or vice versa. Or, there can be degradation in both or neither.

5. There can be a reduction in the number of servers but only if there are no active domains assigned to the CPUs in the servers being removed. When the SVP queries the degradation status it will be provided a degradation warning by the PEP if there will be no CPUs in a pool with active domains. If the user continues after receiving a degradation warning or if there was no degradation warning, then the SVP updates its features control data on the hard drive and in memory. It stores a new CPUID into HSA. CPUFIRM uses the new CPUID for the next store CPUID. Hard drive feature control data holds CPU counts for all servers, the operating system mode and system serial number associated with each server.

6. An HLC is sent to the PEPs notifying them of the change in CPU number.

7. The PEP updates its information and sends an RRCB to Macrocode with notification of the change in CPU number.

8. Macrocode issues a new diagnose command to the SVP to obtain the total number of CPUs purchased, the number of CPUs, operating system mode, unique system serial number, model number,and performance level for server. The diagnose returns CPU counts for all servers.

9. The Macrocode scheduler keeps track of the server's operating system mode in order to know on which CPUs the partition can run. There are two types of partitions. The first is an CCC partition. This type of partition can run in a CPU pool with an operating system mode of CFCC or GENERAL. The second is a non-CCC partition. This type of partition can only run in a CPU pool with a non-CCC operating system mode. Macrocode scheduler will have to account for all servers.

10. The create partition RRCB accepts a server identifier (in the range of 0–F for a 16 CPU system).

11. At domain activation, Macrocode checks to see if there are enough of the right kind of CPUs with the correct operating system mode to allow the domain to be activated.

12. The CPUID is stored in the Logical Processor Block (LPB) at domain activation. The LPB CPUID does not change for an already activated domain, unless an upgrade or downgrade is performed. Macrocode creates different CPUIDs for different partitions depending on the server the partition resides in at domain activation. The version code field contains the count of CPUs in the server's CPU pool. The model number is the same for all partitions. The CPU Identification Number contains a unique system serial number to support CPU pool separation.

13. Macrocode schedules work on the new CPUs if there are LPs already available to use them if this is an upgrade. In the case of a down-grade, Macrocode stops use of the CPUs that are no longer purchased. This stoppage may cause the pool to run degraded if there aren't enough CPUs for all of the LPs that need them. The Macrocode scheduler does an LP-squeeze.

14. Macrocode issues an RRCB to all PEPs indicating that a DCU/DCD operation took place. This RRCB has the new mapping table for Extended Virtual Machine (EVM) to System CPU addresses.

15. Macrocode sends RRCB(s) to all of the PEPs to indicate that the operator may vary the new CPU online to a partition if it is an upgrade and the partition has offline LPs that could be brought online. Since LPs can float across shared CPUs, there may be no need to bring any more LPs online. The PEP will receive as many RRCBs as there are partitions with LPs to be brought online. The PEP will issue a pop-up message to the user and issue log messages.

16. Macrocode sends an RRCB to all of the PEPs indicating that the pool is running degraded if this has happened due to the down-grade. The PEP will issue a pop-up message to the user and log a message.

17. For an upgrade, if so prompted and it is necessary, an operator issues a CF CPU (x) online from MVS, causing an SCLP CF CPU to be sent to Macrocode. Macrocode starts scheduling more LPs on the physical CPUs. If the user has specified that the new LPs should be dedicated and there are enough CPUs to go around, the LPs will be made dedicated. The SCLP CF CPU may fail if there aren't enough CPUs to go around.

18. The customer may wish to change the number of offline processors and the CPU pool in the profiles so that the desired number of CPUs are brought online and the right pool of CPUs are used when the partition is re-activated. If the user doesn't change the profiles, the next partition activation may fail.

While the invention has been particularly shown and described with reference to preferred embodiments thereof, it will be understood by those skilled in the art that the foregoing and other changes in form and details may be made therein without departing from the scope of the invention.

What is claimed is:

1. A multiprocessor system having a plurality of CPUs operable in different modes, including a user mode for processing user programs and a system mode for processing system programs unavailable to users, said multiprocessor system having a dynamic configuration subsystem for operation in the system mode comprising:
   a service processor having a feature file for identifying a current online number of CPUs and for identifying one or more server numbers of CPUs where each server number is less than said online number,
   a configuration control unit for configuring CPUs in the multiprocessor system,
      store means for storing code in response to the feature file including storing said online number and said server numbers,
      system state execution means for executing the code to form configuration control information,
      decoder means for decoding the control information to partition said CPUs into servers, each server having a number of CPUs equal to a corresponding one of said server numbers.

2. The system of claim 1 wherein a sum of said server numbers is less than or equal to said online number.

3. The system of claim 1 including means for assigning domains to each of said servers.

4. The system of claim 3 including means for assigning logical processors to each of said domains.

5. The system of claim 1 including means for assigning a unique identification number to each of said servers.

6. The system of claim 5 wherein each identification number includes an indication of the server number for identifying how many CPUs are in the server and a unique serial number for the server.

7. The system of claim 6 wherein said multiprocessor system executes software limited for use on pools of CPUs not exceeding an authorized number of CPUs and wherein said software is enabled to run on one of said servers having a server number not exceeding said authorized number and is not enabled to run on any server having a server number exceeding said authorized number.

8. The system of claim 7 wherein said software includes means for checking the server number of servers enabled to run the software to determine if the server number is less than or equal to the authorized number.

9. The system of claim 5 wherein the identification number is CPUID and wherein the multiprocessor system includes one or more CPUIDs, one for each server.

10. The system of claim 1 wherein said plurality of CPUs includes offline CPUs.

11. The system of claim 1 capable of being shutdown to terminate operation, and wherein,
   said service processor identifies in said feature file a current offline number corresponding to a current number of offline CPUs and an update number corresponding to changes to be made in the current online number and the current offine number,
   said configuration control unit reconfigures CPUs in the multiprocessor system without being shutdown through operation of said decoder means decoding the control information to change the current number of online CPUs and the current number of offline CPUs by the update number.

12. The system of claim 11 wherein the reconfiguration is an upgrade to add to the current number of online CPUs.

13. The system of claim 11 wherein the reconfiguration is an downgrade to subtract from the current number of online CPUs.

14. The system of claim 1 wherein said service processor identifies in said feature file different pools of CPUs including said servers.

15. The system of claim 14 wherein said different pools of CPUs include coupling control code CPUs.

16. The system of claim 14 wherein said different pools of CPUs include spare CPUs.

17. The system of claim 1 wherein said service processor identifies in said feature file different pools of CPUs including said servers, including coupling control CPUs and including spare CPUs.

18. A multiprocessor system having a plurality of CPUs operable in different modes, including a user mode for processing user programs limited for use on pools of CPUs not exceeding an authorized number of CPUs and a system mode for processing system programs unavailable to users, said multiprocessor system having a dynamic configuration subsystem for operation in the system mode comprising:
   a service processor having a feature file for identifying a current online number of CPUs and for identifying one or more server numbers of CPUs where each server number is less than said online number,
   means for assigning a unique identification number to each of said servers, each identification number including an indication of the server number for identifying how many CPUs can used by the server for execution of said user programs, a configuration control unit for configuring CPUs in the multiprocessor system, store means for storing code in response to the feature file including storing said online number and said server numbers, system state execution means for executing the code to form configuration control information, decoder means for decoding the control information to partition said CPUs into servers, each server having a number of CPUs equal to a corresponding one of said server numbers, means to enable said user programs to run on one of said servers having a server number not exceeding said authorized number and means to inhibit said user programs to run on any server having a server number exceeding said authorized number.

* * * * *